US011817085B2

(12) United States Patent
Chao et al.

(10) Patent No.: US 11,817,085 B2
(45) Date of Patent: Nov. 14, 2023

(54) AUTOMATICALLY DETERMINING LANGUAGE FOR SPEECH RECOGNITION OF SPOKEN UTTERANCE RECEIVED VIA AN AUTOMATED ASSISTANT INTERFACE

(71) Applicant: Google LLC, Mountain View, CA (US)

(72) Inventors: Pu-Sen Chao, Los Altos, CA (US); Diego Melendo Casado, Mountain View, CA (US); Ignacio Lopez Moreno, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 51 days.

(21) Appl. No.: 17/120,906

(22) Filed: Dec. 14, 2020

(65) Prior Publication Data
US 2021/0097981 A1  Apr. 1, 2021

Related U.S. Application Data

(63) Continuation of application No. 15/769,023, filed as application No. PCT/US2018/027812 on Apr. 16, 2018, now Pat. No. 10,896,672.

(51) Int. Cl.
*G10L 15/14* (2006.01)
*G10L 15/02* (2006.01)
(Continued)

(52) U.S. Cl.
CPC ............. *G10L 15/14* (2013.01); *G06F 3/167* (2013.01); *G10L 15/005* (2013.01); *G10L 15/02* (2013.01);
(Continued)

(58) Field of Classification Search
CPC ....... G10L 15/14; G10L 15/005; G10L 15/02; G10L 15/1822; G10L 15/183;
(Continued)

(56) References Cited

U.S. PATENT DOCUMENTS 5,515,475 A * 5/1996 Gupta .................... G10L 15/08
704/256.4
7,873,517 B2    1/2011 Prieto et al.
(Continued)

FOREIGN PATENT DOCUMENTS

CN          201332158        10/2009
CN          101901599        12/2010
(Continued)

OTHER PUBLICATIONS

Intellectual Property India; Office Action issued in Application No. 201927051483; 6 pages; dated Mar. 18, 2021.
(Continued)

*Primary Examiner* — Michael Colucci
(74) *Attorney, Agent, or Firm* — Gray Ice Higdon

(57) ABSTRACT

Implementations relate to determining a language for speech recognition of a spoken utterance, received via an automated assistant interface, for interacting with an automated assistant. Implementations can enable multilingual interaction with the automated assistant, without necessitating a user explicitly designate a language to be utilized for each interaction. Selection of a speech recognition model for a particular language can based on one or more interaction characteristics exhibited during a dialog session between a user and an automated assistant. Such interaction characteristics can include anticipated user input types, anticipated user input durations, a duration for monitoring for a user response, and/or an actual duration of a provided user response.

16 Claims, 5 Drawing Sheets

(51) Int. Cl.
| | |
|---|---|
| *G10L 15/18* | (2013.01) |
| *G06F 3/16* | (2006.01) |
| *G10L 15/00* | (2013.01) |
| *G10L 15/183* | (2013.01) |
| *G10L 15/22* | (2006.01) |
| *G10L 15/30* | (2013.01) |
| *G10L 15/08* | (2006.01) |

(52) U.S. Cl.
CPC ........ *G10L 15/183* (2013.01); *G10L 15/1822* (2013.01); *G10L 15/22* (2013.01); *G10L 15/30* (2013.01); *G10L 2015/088* (2013.01); *G10L 2015/223* (2013.01); *G10L 2015/228* (2013.01)

(58) Field of Classification Search
CPC ... G10L 15/22; G10L 15/30; G10L 2015/088; G10L 2015/223; G10L 2015/228; G10L 15/32; G10L 15/1815; G10L 15/063; G06F 3/167
See application file for complete search history.

(56) References Cited

U.S. PATENT DOCUMENTS

| | | | |
|---|---|---|---|
| 8,909,528 | B2 | 12/2014 | Eide |
| 9,031,829 | B2* | 5/2015 | Leydon ............... G06Q 10/107 463/31 |
| 9,418,567 | B1 | 8/2016 | Chen et al. |
| 9,606,767 | B2* | 3/2017 | Corfield ............... G06F 3/167 |
| 9,786,271 | B1 | 10/2017 | Combs et al. |
| 9,786,281 | B1 | 10/2017 | Adams et al. |
| 9,953,634 | B1* | 4/2018 | Pearce ............... G10L 15/063 |
| 9,953,636 | B2* | 4/2018 | Cohen ................ G10L 15/06 |
| 10,839,793 | B2 | 11/2020 | Chao et al. |
| 11,017,766 | B2 | 5/2021 | Chao et al. |
| 2003/0018475 | A1* | 1/2003 | Basu ................ G06V 40/161 704/E11.003 |
| 2005/0187770 | A1* | 8/2005 | Kompe ............... G10L 15/065 704/250 |
| 2008/0281598 | A1 | 11/2008 | Eide |
| 2011/0055256 | A1* | 3/2011 | Phillips ............... G10L 15/30 707/769 |
| 2012/0323557 | A1 | 12/2012 | Koll et al. |
| 2013/0238336 | A1 | 9/2013 | Sung et al. |
| 2013/0332147 | A1 | 12/2013 | Corfield |
| 2014/0012577 | A1 | 1/2014 | Freeman et al. |
| 2014/0012578 | A1 | 1/2014 | Morioka |
| 2014/0272821 | A1 | 9/2014 | Pitschel et al. |
| 2014/0280051 | A1 | 9/2014 | Djugash |
| 2015/0006147 | A1 | 1/2015 | Schmidt |
| 2015/0120288 | A1 | 4/2015 | Thomson et al. |
| 2015/0142704 | A1 | 5/2015 | London |
| 2015/0302855 | A1 | 10/2015 | Kim et al. |
| 2015/0364129 | A1 | 12/2015 | Gonzalez-Dominguez et al. |
| 2016/0035346 | A1 | 2/2016 | Chengalvarayan |
| 2016/0140218 | A1 | 5/2016 | Moreno et al. |
| 2016/0162469 | A1 | 6/2016 | Santos |
| 2016/0217788 | A1 | 7/2016 | Stonehocker et al. |
| 2016/0217790 | A1* | 7/2016 | Sharifi ............... G10L 15/22 |
| 2016/0329048 | A1* | 11/2016 | Li ..................... G09B 19/06 |
| 2016/0350285 | A1* | 12/2016 | Zhao ................ G06F 16/3344 |
| 2017/0309271 | A1* | 10/2017 | Chiang ............... G10L 13/0335 |
| 2018/0018959 | A1* | 1/2018 | Des Jardins ........... G10L 15/22 |
| 2018/0068653 | A1 | 3/2018 | Trawick |
| 2018/0211650 | A1* | 7/2018 | Knudson ............... G10L 15/183 |
| 2019/0102481 | A1 | 4/2019 | Sreedhara |
| 2019/0318724 | A1 | 10/2019 | Chao et al. |
| 2019/0318729 | A1 | 10/2019 | Chao et al. |
| 2020/0104094 | A1* | 4/2020 | White ................ G10L 17/00 |

FOREIGN PATENT DOCUMENTS

| | | |
|---|---|---|
| CN | 104282307 | 1/2015 |
| CN | 104505091 | 4/2015 |
| CN | 104575493 | 4/2015 |
| CN | 104978015 | 10/2015 |
| CN | 105190607 | 12/2015 |
| CN | 105957516 | 9/2016 |
| CN | 106710586 | 5/2017 |
| CN | 106997762 | 8/2017 |
| CN | 107623614 | 1/2018 |
| CN | 107895578 | 4/2018 |
| WO | 2015112149 | 7/2015 |
| WO | 2015196063 | 12/2015 |

OTHER PUBLICATIONS

European Patent Office; Communication Pursuant to Article 94(3) EPC issue in Application No. 20177711.7; 5 pages; dated Sep. 28, 2021.

Gonzalez-Dominguez, J., et al. "A Real-Time End-to-End Multilingual Speech Recognition Architecture". IEEE Journal of Selected Topics in Signal Processing, vol. 9, No. 4, Jun. 2015; pp. 749-759. Jun. 2015.

European Patent Office; International Search Report and Written Opinion of PCT Ser. No. PCT/US2018/027812; 14 pages; dated Oct. 1, 2018 Oct. 1, 2018.

European Patent Office; Intention to Grant of EP Ser. No. 18722336.7; 44 pages; dated Dec. 20, 2019.

European Patent Office; Communication issue in Application No. 20177711.7; 9 pages; dated Aug. 25, 2020.

Intellectual Property Office of Singapore; Notice for Eligibility of Grant issued in Application No. 11201912053X; 4 pages; dated Dec. 13, 2022.

China National Intellectual Property Administration; Notification of First Office Action issued for Application No. 201880039579.9, 22 pages, dated Jan. 13, 2023.

Levit, M. et al.; End-to-end speech recognition accuracy metric for voice-search tasks; IEEE International Conference on Acoustics; Speech and Signal Processing (ICASSP); Japan; pp. 5141-5144; dated 2012.

Sun, L. et al.; Generating language distance metrics by language recognition using acoustic features; 8th International Conference on Wireless communications & Signal Processing (WCSP); China; pp. 1-5; dated 2016.

European Patent Office; Intention to Grant issued in Application No. 20195508.5; 48 pages; dated Mar. 14, 2023.

China National Intellectual Property Administration; Notification of First Office Action issued for Application No. 201880039581.6, 22 pages, dated Mar. 1, 2023.

China National Intellectual Property Administration; Notice of Allowance issued for Application No. 201880039579.9, 6 pages, dated May 29, 2023.

* cited by examiner

AUTOMATICALLY DETERMINING LANGUAGE FOR SPEECH RECOGNITION OF SPOKEN UTTERANCE RECEIVED VIA AN AUTOMATED ASSISTANT INTERFACE

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, an automated assistant can convert audio data, corresponding to a spoken utterance of a user, into corresponding text (or other semantic representation). For example, audio data can be generated based on detection of a spoken utterance of a user via one or more microphones of a client device that includes an assistant interface for enabling the user to interact with an automated assistant. The automated assistant can include a speech recognition engine that attempts to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

However, many speech recognition engines are configured to recognize speech in only a single language. For multilingual users and/or households, such single language speech recognition engines can be unsatisfactory, and can cause an automated assistant to fail and/or provide erroneous output when a spoken utterance is received in an additional language that is not the single language supported by the speech recognition engines. This can render the automated assistant unusable and/or lead to excess usage of computational and/or network resources. Excess usage of computational and/or network resources can be a result of a user needing to provide a further spoken utterance, that is in the single language supported, when the automated assistant fails or provides erroneous output. Such further spoken utterance must additionally be processed by a corresponding client device and/or remote automated assistant component(s), thereby causing additional usage of various resources.

Other speech recognition engines may be configured to recognize speech in multiple languages, but require a user to explicitly designate which of the multiple languages should be utilized in speech recognition at a given time. For example, some of the other speech recognition engines may require a user to manually designate a default language to be utilized in speech recognition of all spoken utterances received at a particular client device. To change the default language to another language, the user can be required to interact with a graphical and/or audible interface to explicitly alter the default language. Such interaction can lead to excess usage of computational and/or network resources in the rendering of the interface, the processing of inputs of the user provided via the interface, etc. Further, it may often be the case that a user forgets to change the default language prior to providing a spoken utterance that is not currently the default language. This can render the automated assistant unusable and/or lead to excess usage of computational and/or network resources as described above.

SUMMARY

Implementations described herein relate to systems, methods, and apparatus for automatically determining a language for speech recognition of a spoken utterance received via an automated assistant interface. In some implementations, speech recognition of a spoken utterance using a given language can include processing audio data, which captures the spoken utterance, using one or more speech recognition models for the given language in order to generate text that corresponds to the spoken utterance, and that is in the given language. As described herein, multiple speech recognition models can be accessible for speech recognition, and each of the speech recognition models can be configured for a corresponding language of multiple languages. For example, a first speech recognition model can be configured for generating English text based on processing audio data including English spoken utterances, a second speech recognition model can be configured for generating French text based on processing audio data including French spoken utterances, a third speech recognition model can be configured for generating Spanish text based on processing audio data including Spanish spoken utterances, etc.

Some implementations described herein can utilize various techniques to select only a subset of languages to utilize in speech recognition of a given spoken utterance of a given user. For example, the given user can be associated with multiple candidate languages assigned to their respective automated assistant, or a user profile accessible to the automated assistant. The multiple candidate languages can be manually assigned by the user and/or automatically assigned based on past usage of the candidate language(s) by the user across one or more platforms. As described herein, selecting only the subset of languages can be based on, for example, probability metrics assigned to the multiple candidate languages for a particular user or user profile. The probability metrics can be based on past usage of the multiple candidate languages, and each probability metric can correspond to one or more interaction characteristics (e.g., each based on an instant interaction between the user and the automated assistant(s)).

As one particular example, a single particular language, of multiple languages assigned to the user profile, can have an assigned probability metric, for one or more interaction characteristics or parameters (e.g., a duration of a response from the user, a length of a delay in responding to the automated assistant, an anticipated type of input or type of speech to be provided to the automated assistant), where the probability metric indicates a very high likelihood of the single particular language being spoken by the given user. Based on the assigned probability metric, the single particular language can be selected, and speech recognition performed using only speech recognition model(s) for the single language. Performing the speech recognition can result in corresponding text, in the single language, that can then be further processed by additional component(s) of an automated assistant in generating content that is responsive to the given spoken utterance. The content that is responsive can then be provided for rendering at the client device for presentation to the user. The content that is responsive can optionally be in the same single language, or provided to cause rendering in the same single language.

As another particular example, two particular languages, of three or more candidate languages assigned to the user profile, can have corresponding assigned probability metrics, for one or more interaction characteristics, where the probability metrics each indicate at least a likelihood of a corresponding one of the two particular languages being spoken by the given user. Based on the assigned probability metrics, the two particular languages can be selected, and speech recognition of the given spoken utterance performed using only speech recognition models for the two particular languages. The other candidate language(s) may not be selected for speech recognition based on their corresponding assigned probability metrics, for the one or more current contextual parameters, failing to satisfy a threshold.

These and other implementations that select only a subset of candidate languages of a user to utilize in speech recognition of a spoken utterance of the user can conserve various resources of device(s) (e.g., client device(s) and/or remote automated assistant component(s)) that perform the speech recognition), as only speech recognition model(s) that correspond to the subset of languages are utilized in performing the speech recognition. Further, these and other implementations that utilize probability metrics for languages and/or measures for generated text can increase the likelihood that an automated assistant generates responsive content based on the appropriate text. This can lead to an improved automated assistant, and can also conserve various resources as it mitigates risk of the automated assistant providing errant responsive content based on recognition of text using a language that is not the language being spoken in a spoken utterance. Such mitigation of risk of errant responsive content prevents further resource intensive detection of further user interface input (and processing of that input) in attempting to rectify the errant responsive content.

As mentioned above and described elsewhere herein, in many implementations two or more (e.g., all associated with a user profile) candidate languages are utilized in speech recognition of a spoken utterance. However, responsive content to provide in response to the spoken utterance is determined based on only output from a speech recognition model for a single one of the candidate languages. Determining which output to utilize in determining content to provide in response to the spoken utterance can be based on, for example, a monitoring duration, an input duration, an anticipated type of input, and/or other interaction characteristics as described herein. Determining which output to utilize can additionally or alternatively be based on, for example, probabilities of the outputs generated using the speech recognition models, a quantity of hypotheses generated for one or more of the speech recognition models, probabilities for languages based on processing the spoken utterance over a separate machine learning model, and/or other factors.

As one particular example, assume a speech recognition model for a first language was utilized in processing a previous spoken utterance to generate previous text in the first language, and the previous text in the first language was utilized to generate previous content that has been rendered in response to the previous spoken utterance. Further assume a spoken utterance is received in response to the rendered previous content. Speech recognition of the spoken utterance can be performed using the speech recognition model for the first language to generate one or more candidate text strings (e.g., hypotheses) in the first language and a corresponding probability for each candidate text string in the first language. Speech recognition of the spoken utterance can also be performed using an additional speech recognition model for a second language to generate one or more candidate text strings in the second language and a corresponding probability for each candidate text string in the second language. Which candidate text string is utilized in generating responsive content for the spoken utterance can be based on their corresponding probabilities (e.g., biasing toward higher probabilities). Additionally or alternatively, which candidate text string is utilized in generating responsive content for the spoken utterance can be based on a quantity of candidate text strings for each of the languages (e.g., biasing toward candidate text string(s) for a language with a greater quantity of candidate text strings). Additionally or alternatively, which candidate text string is utilized in generating responsive content for the spoken utterance can be based on probabilities for languages, where the probabilities are determined based on processing the spoken utterance over a separate machine learning model (e.g., biasing toward candidate text string(s) for a language with a higher probability). For example, the separate machine learning model can be a neural network model that accepts, as input, audio of the spoken utterance (e.g., features thereof) and that can be utilized to generate, as output, a distribution of probabilities over the languages. Additionally or alternatively, other criteria can be considered such as language probabilities associated with the previous spoken utterance. Moreover, as described in more detail herein, various implementations can also determine which candidate text string is utilized based on one or more interaction characteristics such as a monitoring duration for monitoring of the spoken utterance, an input duration of the spoken utterance, and/or an anticipated type of the spoken utterance.

As mentioned above, a user profile can be created for a particular user of a device or application in order to, inter alia, characterize language preferences of the user. Users can be provided control over their user profiles, and a user can control whether any user profile is created for the user. A user profile for a user can identify multiple different languages that the user can use when engaging with the device or application. In some implementations, the user profile can be manually created or modified by the user in order that the user can manually designate preferred languages with which the user can engage with the automated assistant.

In some implementations, a selection of a language for processing a response or an anticipated response from a user can be based on interaction characteristic(s), such as a duration of the response provided by the user, provided in response to content from the automated assistant. For instance, each language for a user can be associated with one or more scores or probabilistic metrics that indicate a likelihood that a response is provided by the user in a particular language. Furthermore, a language can be associated with multiple scores, and each score of the multiple scores can correspond to an interaction characteristic satisfying or not satisfying a particular threshold. In other words, when an interaction characteristic satisfies a particular threshold, a first probabilistic metric for the language can be considered active, and when the interaction characteristic does not satisfy the particular threshold, a second probabilistic metric for the language can be considered active.

The selected probabilistic metric can be compared and/or processed with other probabilistic metrics in order to determine a suitable speech recognition model to use for processing the audio data corresponding to the response for the user. In some implementations, the speech recognition model for a first language can be selected over a speech recognition model for a second language, strictly based on whether the interaction characteristic did or did not satisfy a particular threshold. In other words, instead of processing scores or metrics, a speech recognition model can be more discretely selected according to whether an interaction characteristic, such as response duration, satisfies a particular threshold, or otherwise occurred.

In some implementations, an occurrence of one or more interaction characteristics can cause a selected speech recognition model to be re-evaluated, in order to determine whether to continue using the active speech recognition model or activate a different speech recognition model. For instance, a user can initially provide an invocation phrase to an automated assistant interface for invoking the automated assistant and initialize a dialog session. Audio data corresponding to the invocation phrase can be processed to determine a user profile corresponding to the user. The user profile can indicate a default language that the user more commonly prefers to speak in. Alternatively, the user profile can indicate multiple different languages, and each language of the multiple different languages can be associated with a probabilistic metric or score. The probabilistic metric can convey a weight to be considered when selecting a particular language for the automated assistant to use when interacting with the user at a particular time. For example, the user profile can indicate that English has a weight of 0.9 and Chinese has a weight of 0.7. As a result, English can be designated as a default language for the user because the weight for English is greater than the weight for Chinese.

As the dialog session between the user and the automated assistant continues, one or more interaction characteristics can be identified in order to cause the current language for the automated assistant to be re-evaluated. For instance, an interaction characteristic can be an anticipated input duration, an anticipated input type, an actual input duration, a monitoring duration, and/or any other characteristic of an interaction suitable for indicating that a user may change the language they are speaking in. When the interaction characteristic occurs, the audio data received relative to the interaction characteristic can be processed through multiple different speech recognition models corresponding to multiple different languages. Text or phonemes resulting from the processing can be analyzed to determine a language that the text or phonemes most likely corresponds to. For instance, textual data or phoneme data can be generated from each of the models, and percentage similarities for the languages can be provided. A speech recognition model corresponding to a language that has the highest percentage similarity for the text or phonemes generated can be activated. In other words, as a result of the interaction characteristic(s) occurring, the active speech recognition model can be re-evaluated to determine whether a different speech recognition model should be activated.

In some implementations, a probabilistic metric corresponding to a language associated with the active speech recognition model can be higher as a result of being activated. In this way, if determining a correspondence between text or phonemes and multiple languages results in a tie between at least two languages, the language associated with the currently active speech recognition model can be selected over the other languages. In some implementations, each interaction characteristic can be weighted individually, and/or in association with each language. For instance, a score corresponding to an active Chinese language speech recognition model can be lowered by a factor of 0.95 when an interaction characteristic (e.g., a monitoring threshold is reached), while a score corresponding to an active English language speech recognition model can be lowered by a factor of 0.6 when an interaction characteristic (e.g., a monitoring threshold is reached) occurs. In this way, when a score for an active speech recognition model reaches or falls below a score for an inactive speech recognition model, the spoken utterance relative to the interaction characteristic can be processed according to multiple models in order to determine a more suitable speech recognition model. The text or phonemes resulting from the processing can be compared to determine a language that is most suitable for the automated assistant when processing the spoken utterance and/or subsequent spoken utterances.

In some implementations, interaction characteristics can be one or more anticipated characteristics of an interaction, and the interaction characteristics can be at least partially based on historical interactions between the user and the automated assistant. The one or more anticipated characteristics can include words, phrases, types of speech, types of words and/or phrases, format of speech, diction, terminology, and/or any other characteristic that a spoken utterance can embody. Furthermore, historical interaction data accessible to an automated assistant can indicate that a user typically provides certain spoken utterances in a particular language. For example, the historical interaction data can indicate that a user frequently provides a type of word, such as numbers, in Spanish. Therefore, during interactions between the user and the automated assistant that involve the automated assistant providing a prompt for the user to say a number, the automated assistant can cause a Spanish language speech recognition model to be selected for processing the anticipated input (e.g., a particular number spoken in Spanish, such as "uno"). Alternatively, when the automated assistant determines that an anticipated type of speech is associated with a prompt to be provided to a user, the automated assistant can cause the active speech recognition model to be re-evaluated. For instance, instead of continuing to use the active speech recognition model when an anticipated type of speech is expected in response to a prompt from the automated assistant, the automated assistant can cause responsive content from the user to be processed through multiple different speech recognition models. A speech recognition model that provides text or phonemes that are most closely related to a particular language can be activated for processing the remaining portion of the responsive content and/or any other subsequent content provided by the user.

As an example, the user can request that the automated assistant order tickets for an upcoming concert by providing a spoken utterance such as, "Assistant, order tickets for the Chopin concert tonight." The automated assistant can optionally determine a user profile associated with the user that provided the spoken utterance. For example, the automated assistant can determine the user profile based on determining that at least a portion of audio data, that captures the spoken utterance, has one or more features (e.g., intonation, pitch, tone, accents, intonation, and/or any other feature) that correspond to feature(s) assigned to the user profile. For example, the audio data can be processed, using one or more acoustic models, to determine features of the audio data, and those feature(s) compared to feature(s) of candidate user profile(s) (e.g., candidate user profile(s) associated with a client device via which the audio data is received), and one of the candidate user profile(s) determined as the user profile for the audio data based on the comparison indicating a sufficient match. The user profile can include a subset of assigned language models with which to perform further processing of the audio data. When the automated assistant has identified the user profile, the automated assistant can access historical interaction data associated with the user profile to determine whether the user typically provides particular types of spoken utterances in a particular language. Based on this determination, the automated assistant can compare the resulting determination to a current interaction to further determine whether the user will exhibit a language change during the current interaction. For instance, although the user provided the above request for tickets in English, the user can have a history of providing numbers in Spanish. Therefore, an anticipated interaction characteristic for the current interaction can be associated with a Spanish language/number input. In response to determining the anticipated interaction characteristic, the automated assistant can select a Spanish language speech recognition model for processing audio data received after automated assistant prompts the user for a number of tickets (e.g., "Okay, how many tickets would you like to order?"). When the user has provided the number response in Spanish, the automated assistant can thereafter cause the active language model for processing spoken utterances to switch back to English, or the previously active language model, unless a determined interaction characteristic indicates and/or the historical interaction data indicates otherwise.

In some implementations, interaction characteristics for selecting one or more speech recognition models can include one or more delay periods or monitoring durations that occur during an interaction between the user and the automated assistant. A delay period can be a duration of time between when the automated assistant provides content and the user provides a spoken utterance in response after, or in response to, the content is provided by the automated assistant. When a user delays in responding to content from the automated assistant, and the duration of the delay satisfies a monitoring threshold, the automated assistant can cause the active speech recognition model to be re-evaluated, or otherwise cause a most recent response to be processed according to multiple speech recognition models to determine whether the user has started to speak in a different language.

As an example, a user can invoke the automated assistant for ordering a food delivery using a spoken utterance such as, "Assistant, I'd like to make a Chinese delivery order." In response, the automated assistant can process the spoken utterance using a first speech recognition model and provide content such as, "Ok, what would you like to order?" The automated assistant can then monitor a duration of a delay in the response from the user. For example, the duration delay can be measured starting when the automated assistant began providing the content regarding what the user would like to order, or when the automated assistant completed providing of the content. Initially, an English language speech recognition model can be active during the delay period, and if the user responds within a threshold duration of time, the English language speech recognition model can remain active for processing the response from the user. However, when the duration of the delay period reaches and/or exceeds a delay time period or threshold, the automated assistant can activate multiple speech recognition models, including a Chinese language speech recognition model, for processing a subsequent spoken utterance. The output from the models can be used to determine the language that the user is most likely speaking. The speech recognition model corresponding to the language that the user is most likely speaking, at least according to the models, can be activated for further processing spoken utterances from the user.

In some implementations, a delay in a response from the user can indicate that a different user will be responding to the automated assistant. For instance, the automated assistant can access historical interaction data that indicates that, when a first user delays responding for a threshold period of time, a second user will respond to the automated assistant. For example, if a first user provides a spoken utterance such as, "Assistant, I'd like to make a Chinese delivery order," and the first user delays for a threshold period of time after the automated assistant replies "Ok, what would you like to order?," the automated assistant can determine that such a delay is typically associated with a second user responding. The automated assistant can then determine a preferred language associated with the second user and employ the preferred language speech recognition model for processing any audio data corresponding to an additional spoken utterance received after the reply from the automated assistant. Alternatively, in response to determining that the delay has occurred, the automated assistant can activate multiple speech recognition models for processing the next spoken utterance after the delay. The output of the models can be used to determine, for example when the user providing the input has changed.

In some implementations, a subset of different speech recognition models can be selected from a group of speech recognition models for conducting a dialog session between the user and automated assistant. The subset of speech recognition models can then be used to process a portion of audio data corresponding to a spoken utterance from the user during the dialog session. For instance, a first speech recognition model can be used to process the portion of audio data to generate first predicted text in a first language, and a second speech recognition model can be used to process the portion of audio data to generate second predicted text in a second language. Furthermore, a first measure can be generated from the first predicted text to indicate a likelihood that the first predicted text is correct, and a second measure can be generated from the second predicted text to indicate a separate likelihood that the second predicted text is correct. Thereafter, depending on the predicted text that has the highest likelihood of being correct, responsive content can be generated based on the first predicted text or the second predicted text. In some implementations, the responsive content can be further or additionally based one or more of a monitoring duration corresponding to a time period for the monitoring for the additional spoken input from the user, an input duration corresponding to a duration of the additional spoken utterance of the user, and an anticipated type of input for the additional spoken utterance.

In some implementations, a method implemented by one or more processors is set forth as including operations such as receiving audio data corresponding to a spoken utterance of a user. The audio data can be based on detection of the spoken utterance at a client device that includes an automated assistant interface for interacting with an automated assistant. The operations can further include processing the audio data using a first speech recognition model corresponding to a first language; determining, based on processing the audio data using the first speech recognition model, content that is responsive to the spoken utterance of the user; and causing the client device to render the content to the user. The content can include a prompt that solicits further input from the user. The operations can further include in response to determining the content includes the prompt, monitoring for additional spoken input. Additionally, the method can include receiving, during the monitoring, additional audio data corresponding to an additional spoken utterance. The additional audio data can be based on detection of the additional spoken utterance by the automated assistant interface of the client device. The method can further include determining whether to utilize the first speech recognition model for the first language, or an alternative speech recognition model for a second language, in determining further responsive content to provide in response to the additional spoken utterance; and causing the client device to render the further responsive content.

Determining whether to utilize the first speech recognition model or the alternative speech recognition model in determining the further responsive content can be based on a monitoring duration corresponding to a time period for the monitoring for the additional spoken input from the user. In this way, as the monitoring duration increases, a probability of utilizing the alternative speech recognition model increases. Determining whether to utilize the first speech recognition model or the alternative speech recognition model in determining the further responsive content can be based on an input duration corresponding to a duration of the additional spoken utterance of the user. In this way, as the input duration increases, a probability of utilizing the alternative speech recognition model increases. In some implementations, the method can include identifying an anticipated duration for the additional spoken utterance based on the prompt. Furthermore, determining whether to utilize the first speech recognition model or the alternative speech recognition model can based on the input duration can be based on comparison of the anticipated duration to the input duration, and as a difference based on the comparison increases, a probability of utilizing the alternative speech recognition model increases. Determining whether to utilize the first speech recognition model or the alternative speech recognition model in determining the further responsive content can be based on an anticipated type of input for the additional spoken utterance. Determining whether to utilize the first speech recognition model or the alternative speech recognition model in determining the further responsive content can include: identifying a first measure, for the user, that is based on past inputs of the user in the first language in response to past prompts of the anticipated type; identifying a second measure, for the user, that is based on past inputs of the user in the second language in response to the past prompts of the anticipated type; and determining whether to utilize the first speech recognition model or the alternative speech recognition model based on the first measure and the second measure.

In some implementations, the method can include identifying a user profile for the user based on the audio data or based on additional sensor data from one or more additional sensors of the client device. Furthermore, identifying the first measure and the second measure for the user can be based on the first measure and the second measure being stored in association with the user profile. Determining whether to utilize the first speech recognition model or the alternative speech recognition model in determining the further responsive content can include: processing the additional audio data using the first speech recognition model to generate first predicted text in the first language, and a first measure that indicates a first likelihood that the first predicted text is correct; processing the additional audio data using the alternative speech recognition model to generate second predicted text in the second language, and a second measure that indicates a second likelihood that the second predicted text is correct; determining the further responsive content utilizing the second predicted text, wherein determining the further responsive content utilizing the second predicted text is based on the second measure and is based on one or more of: a monitoring duration corresponding to a time period for the monitoring for the additional spoken input from the user, an input duration corresponding to a duration of the additional spoken utterance of the user, and an anticipated type of input for the additional spoken utterance. Determining the further responsive content utilizing the second predicted text can be based on the second measure and can be based on two or more of: the monitoring duration, the input duration, and the anticipated type of input for the additional spoken utterance.

In other implementations, a method implemented by one or more processors is set forth as including operations such as receiving audio data corresponding to a spoken utterance of a user. The audio data can be based on detection of the spoken utterance by a client device that includes an automated assistant interface for interacting with an automated assistant. The method can further include processing the audio data using a first speech recognition model corresponding to a first language; determining, based on processing the audio data using the first speech recognition model, content that is responsive to the spoken utterance of the user; causing the client device to render the content to the user and to monitor for additional spoken input following the rendering; and receiving, during the monitoring, additional audio data corresponding to an additional spoken utterance, the additional audio data being based on detection of the additional spoken utterance by the automated assistant interface of the client device. The method can also include determining whether to utilize the first speech recognition model for the first language, or an alternative speech recognition model for a second language, in determining further responsive content to provide in response to the additional spoken utterance, wherein determining whether to utilize the first speech recognition model or the alternative speech recognition model is based on one or more of: a monitoring duration corresponding to a time period for the monitoring for the additional spoken input from the user, an input duration corresponding to a duration of the additional spoken utterance of the user, and an anticipated type of input for the additional spoken utterance. The method can also include causing the client device to render the further responsive content.

In some implementations, determining whether to utilize the first speech recognition model or the alternative speech recognition model can be based on the anticipated type of input for the additional spoken utterance, and the anticipated type of input can include an anticipated diction or anticipated terminology for the additional spoken utterance. In some implementations, the method can include determining the anticipated type of input for the additional spoken utterance based on historical interaction data that identifies at least one interaction between the user and the automated assistant, wherein the user provided the anticipated diction or anticipated terminology to the automated assistant. In some implementations, wherein determining whether to utilize the first speech recognition model or the alternative speech recognition model can be based the monitoring duration. The first speech recognition model can be utilized when the monitoring duration is less than a monitoring threshold, and the alternative speech recognition model can be utilized when the monitoring duration is greater than the monitoring threshold.

In yet other implementations, a method implemented by one or more processors is set forth as including operations such as receiving audio data corresponding to a spoken utterance of a user. The audio data can be based on detection of the spoken utterance a client device that includes an automated assistant interface for interacting with an automated assistant. The method can further include processing the audio data using a first speech recognition model corresponding to a first language; determining, based on processing the audio data using the first speech recognition model, content that is responsive to the spoken utterance of the user; monitoring for an additional spoken input from the user; receiving, during the monitoring, additional audio data corresponding to an additional spoken utterance. The additional audio data can be based on detection of the additional spoken utterance by the automated assistant interface of the client device. The method can further include determining a selection of one or more speech recognitions models to use for processing the additional audio data. The one or more speech recognition models can be selected from multiple different speech recognition models that include at least the first speech recognition model for the first language and a second speech recognition model for a second language. The method can also include processing the additional audio data according to the selection of the speech recognition model; and causing the client device to render further responsive content based on the processing of the additional audio data according to the selection of the speech recognition model.

In some implementations, the additional spoken utterance is provided by another user, and the method can further include: determining that the additional spoken utterance is provided by the other user; and accessing a user profile corresponding to the other user, wherein the user profile provides a correspondence between the other user and the second language. In some implementations, determining the selection of the one or more speech recognition models to use for processing the additional audio data includes designating the second speech recognition model for processing the additional audio data, and designating the second language for rendering the further responsive content. Determining the selection of the one or more speech recognitions models to use for processing the additional audio data can include determining a subset of speech recognition models to use for processing the additional audio data. Processing the additional audio data according to the selection of the speech recognition model can include processing the additional audio data using the subset of speech recognition models. Determining the selection of the speech recognition model to use for processing the additional audio data can include identifying multiple different interaction characteristics that occurred since receiving the audio data corresponding to the spoken utterance from the user. The interaction characteristics can comprise two or more of a monitoring duration, an input duration, and an anticipated type of input for the additional spoken utterance.

Aspects of the present disclosure may advantageously reduce incidents during which a spoken language utterance is not interpreted by an appropriate speech recognition model. In particular, by recognizing that different languages may be adopted in different parts of a dialog, aspects may respond appropriately to such changes. Consequently, an improved response to user input may be received, reducing occasions on which an automatic assistant is unresponsive or does not operate as intended. As well as improving functionality for a user, this may reduce load on computer and/or network resources used to implement such an assistant by reducing repeat commands in order to reach a desired result.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
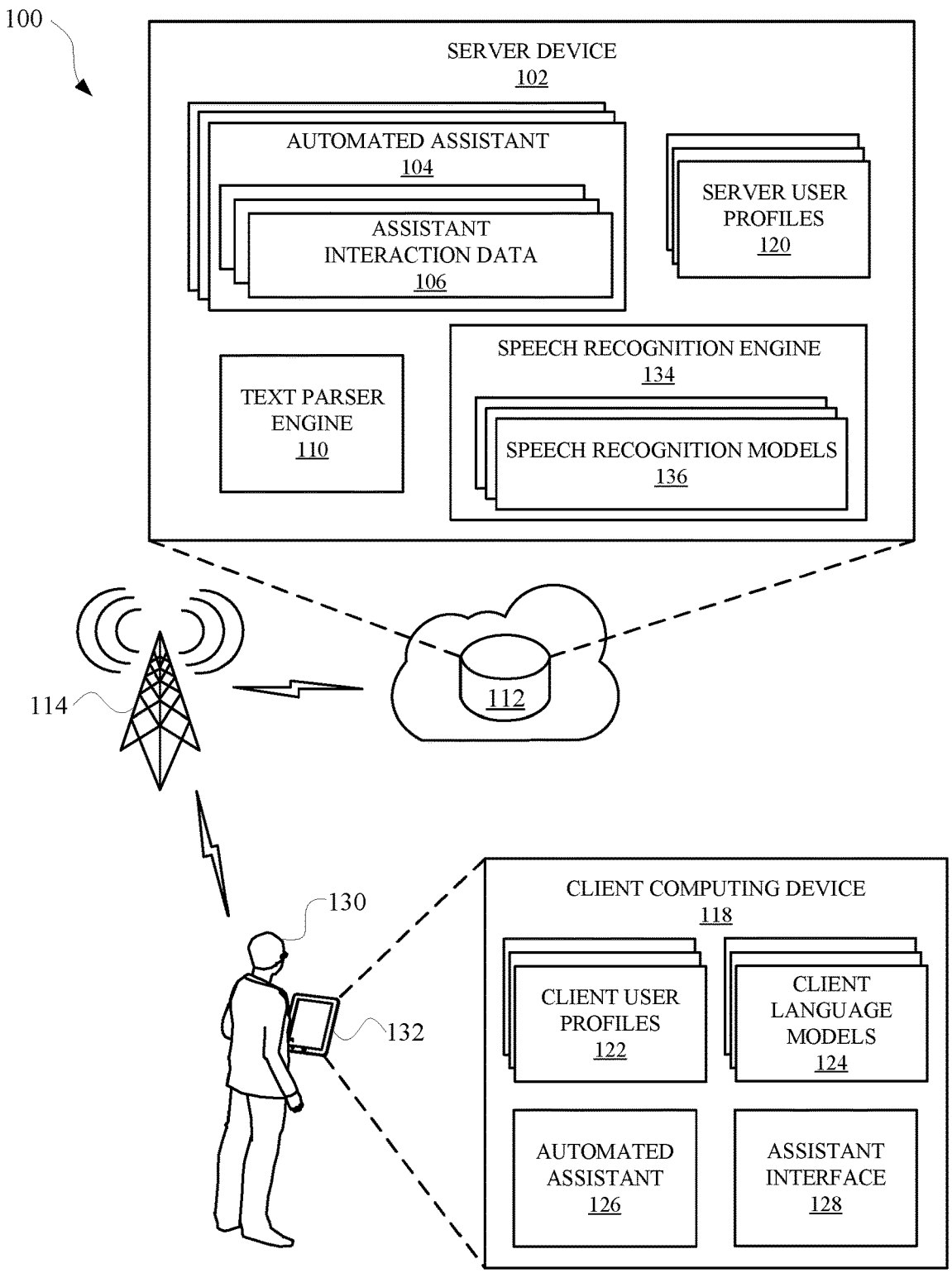
FIG. 1 illustrates a system for selecting a language for an automated assistant to interact with a user.

FIG. 1 illustrates a system 100 for selecting a language for an automated assistant 104 to interact with a user 130. The automated assistant 104 can operate, in part via an automated assistant 126 that is provided at one or more client devices, such as client computing device 118 (e.g., a portable computing device 132), and in part via one or more remote computing device(s) 112, such as a server device 102. The user 130 can interact with the automated assistant 104 via an assistant interface 128 of the client computing device 118. The assistant interface 128 includes user interface input device(s) and user interface output device(s) for use by the automated assistant 126 in interfacing with the user 130. The assistant interface 128 accepts user interface inputs of the user 130 that are directed to the automated assistant 104, and renders content from the automated assistant 104 for presentation to the user 130. The assistant interface 128 can include one or more of a microphone, speaker, a display panel, a camera, a touch screen display, and/or any other user interface device(s) of the client computing device 118. The assistant interface 128 can also include a display, projector, a speaker, and/or any other user interface output device(s) of the client computing device 118 that can be used to render content from the automated assistant 104. A user can initialize the automated assistant 104 by providing a verbal, textual, or a graphical input to the assistant interface 128 to cause the automated assistant 104 to perform a function (e.g., provide data, control a peripheral device, access an agent, etc.). The client computing device 118 can include a display device, which can be a display panel that includes a touch interface for receiving touch inputs and/or gestures for allowing a user to control applications of the client computing device 118 via the touch interface. In some implementations, client computing device 118 can lack a display device, thereby providing an audible user interface output, without providing a graphical user interface output. Furthermore, the client computing device 118 can provide a user interface input device, such as a microphone(s), for receiving spoken natural language inputs from the user 130 (and from additional unillustrated users).

The client computing device 118 can be in communication with the remote computing device 112 over a network 114, such as the internet. The client computing device 118 can offload computational tasks to the remote computing device 112 in order to, for example, conserve computational resources at the client device 118 and/or leverage more robust resources available at the remote computing device 112. For instance, the remote computing device 112 can host the automated assistant 104, and the client computing device 118 can transmit inputs received at one or more assistant interfaces to the remote computing device 112. However, in some implementations, the automated assistant 104 can be hosted by the automated assistant 126 at the client computing device 118. In various implementations, all or less than all aspects of the automated assistant 104 can be implemented by the automated assistant 126 at the client computing device 118. In some of those implementations, aspects of the automated assistant 104 are implemented via the local automated assistant 126 of the client computing device 118 and interface with the remote computing device 112 that implements other aspects of the automated assistant 104. The remote computing device 112 can optionally serve a plurality of users and their associated assistant applications via multiple threads. In implementations where all or less than all aspects of the automated assistant 104 are implemented via the local automated assistant 126 of the client computing device 118, the local automated assistant 126 can be an application that is separate from an operating system of the client device 118 (e.g., installed "on top" of the operating system)—or can alternatively be implemented directly by the operating system of the client device 118 (e.g., considered an application of, but integral with, the operating system).

In some implementations, the remote computing device 112 can include a speech recognition engine 134 that can process audio data received at an assistant interface 126 to determine text and/or other semantic representation(s) of a spoken utterance embodied in the audio data. The speech recognition engine 134 can utilize one or more speech recognition models 136 in determining text and/or other semantic representations of a spoken utterance embodied in audio data. As described herein, multiple speech recognition models 136 can be provided, and each speech recognition model can be for a corresponding language. For example, a first speech recognition model can be for English, a second speech recognition model can be for French, etc. Further, as described herein, which of multiple speech recognition models 136 is utilized in processing of audio data can be based on, for example, information contained in a user profile determined to correspond to the audio data being processed. For example, in some implementations a given user profile can be determined to correspond to audio data being processed based on matching voice features of the audio data to voice features associated with the user profile. Also, for example, in some implementations a given user profile can additionally or alternatively be determined to correspond to audio data being processed based on matching other sensor data (e.g., data from a camera and/or data from a fingerprint sensor), from sensor(s) of the client computing device 118, to corresponding data of the user profile. Continuing with the examples, if the user profile indicates that an English speech recognition model is significantly more likely to be utilized for the user than a French speech recognition model, the English speech recognition model can be utilized to process the audio data. The English speech recognition model can optionally be utilized in lieu of utilizing the French speech recognition model (or any other speech recognition model for a non-English language).

Additionally or alternatively, multiple speech recognition models 136 for multiple different languages can be utilized in processing of audio data to generate multiple candidate semantic and/or textual representations (e.g., each corresponding to a different language). In some of those implementations, probability metrics (optionally dependent on current contextual parameter(s)) for the multiple different languages and/or measures for each of the multiple candidate semantic representations can be utilized to select only one of the candidate semantic representations as appropriate for generating and providing content that is responsive to the given spoken utterance.

In some implementations, the speech recognition models 136 each include one or machine learning models (e.g., neural network models) and/or statistical models for determining text (or other semantic representation) that corresponds to a spoken utterance embodied in audio data. In some implementations, the speech recognition engine 134 can utilize one of the speech recognition models 136 to determine phonemes, for a corresponding language, that are included in the audio data, and then generate text, for the corresponding language, based on the determined phonemes. In some implementations, a speech recognition model receives an audio recording of voice input, e.g., in the form of digital audio data, and converts the digital audio data into one or more text tokens. The model or models used by such functionality, which can collectively be considered a speech recognition model, generally model the relationship between an audio signal and phonetic units in a language, along with word sequences in the language. In some implementations, speech recognition models may be acoustic models, language models, pronunciation models, etc., as well as models combining functionality of one or more of such models. In some implementations, for example, speech recognition models may be implemented as finite state decoding graphs including a plurality of paths or pathways.

The automated assistant 104 can operate according to one or more language models simultaneously in order to be responsive to natural language inputs from the user 130 and/or provide responsive content to the user 130. For example, in some implementations, the automated assistant 104 can operate using an invocation phrase model simultaneously with using a speech recognition model that is associated with a particular language. In this way, the automated assistant can process audio data that embodies an invocation phrase and one or more commands provided in the particular language, and be responsive to both the invocation phrase and the one or more commands. The text, and/or semantic representations of text, converted from the audio data can parsed by a text parser engine 110 and made available to the automated assistant 104 as textual data or semantic data that can be used to generate and/or identify command phrases from the user 130 and/or a third party application.

In some implementations, a language model can include or refer to an acoustic model, a speech recognition model, an invocation phrase model, a voice-to-text model, a voice-to-semantic representation model, a text-to-semantic representation model, and/or any other model that can be used to translate a natural language input into data that can be processed by an application or a device. In some implementations, a language that the automated assistant 104 uses to communicate with the user 130 can be selected from one or more languages identified in a user profile or other account data that can be associated with a user. The automated assistant can access a user profile from one or more server user profiles 120 and/or one or more client user profiles 122. For example, when the user 130 is communicating with an automated assistant 126 at the client computing device 118, the user 130 can provide a spoken natural language input to an assistant interface 128 of the client computing device 118. The spoken natural language input can be converted into audio data, which can be processed by a client language model 124, such as an invocation phrase model for identifying whether the audio data embodies an invocation phrase for invoking the automated assistant 126. The client language model 124 can also provide a voice signature of the user 130. Based on the voice signature of the user 130, the automated assistant 126 can select a client user profile 122 that corresponds to the user 130. The client user profile 122 can identify one or more languages that the identified user 130 prefers to communicate in, depending on a context of an interaction, or characteristics of the interaction between the user 130 and the automated assistant 126.

In some implementations, the invocation phrase model can be employed at the client computing device 118 to determine whether the user 130 is intending to invoke the automated assistant 104. When the user provides a natural language input to the assistant interface 128, and the natural language input includes an invocation phrase for invoking the automated assistant 104, the client computing device 118 can cause the automated assistant 104 at the server device 102 to receive the natural language input and/or subsequent natural language inputs from the user 130. For instance, in response to determining that the user 130 is intending to invoke the automated assistant 104 at the client computing device 118, one or more communication channels can be established between the client computing device 118 and the server device 102. Thereafter, as the user continues to provide natural language inputs to the assistant interface 128, the natural language inputs will be converted into data that is then transmitted over the network 114 and processed by the server device 102. Thereafter, the automated assistant 104 can analyze the data to determine a user profile, that corresponds to the user 130, from one or more server user profiles 120 available at the server device 102. A speech recognition model 136 from the selected server user profile can be selected for communicating with the user 130. The selection of the speech recognition model 136 from the user profile can be based on a context of the user 130, one or more confidence scores or probabilities associated with one or more speech recognition model 136 identified by the user profile, and/or any other information that can be used to select a language.

In some implementations, each language identified by a user profile of the server user profiles 120 and/or the client user profiles 122 can be associated with a probabilistic metric or a confidence score that can be static or dynamic. For instance, when the user 130 is interacting with the automated assistant 126, a first language can be selected from the user profile for the user 130 as a default language for the user 130. However, detection of one or more interaction characteristics can trigger changes to a selection of a speech recognition model being used to process spoken utterances from the user 130. For example, initially the automated assistant 126 can cause the spoken utterances from the user 130 to be processed according to a first speech recognition model corresponding to a first language. When an interaction characteristic is detected, such as a threshold response delay, a threshold response duration, an anticipated response duration, an anticipated response type, and/or any other interaction characteristic, the audio data for a response can be processed through multiple speech recognition models to determine a most suitable speech recognition model for furthering the interaction. The automated assistant can then select the most suitable speech recognition model (e.g., a model that provided an output that is most correlated to a particular language), such as a second speech recognition model, corresponding to a second language, to be used to process subsequent inputs from the user 130.

In some implementations, an interaction characteristic can be associated with a probabilistic metric or a probabilistic function that can provide a variety of values. For instance, when the user 130 is interacting with the automated assistant 126, before an interaction characteristic has been detected, the spoken utterances from the user 130 can be processed according to first speech recognition model associated with a first language. According to the user profile associated with the user 130, the first language can be given a first score when a particular interaction characteristic is not detected, and a second score, that is less than the first score, when the particular interaction characteristic is detected. Furthermore, the user profile associated with the user 130 can indicate that a second language can be given a third score when the particular interaction characteristic is not detected, and a fourth score, that is higher than the first score, when the interaction characteristic is detected. As a result, when the particular interaction characteristic is detected during the interaction between the user 130 and the automated assistant 126, the first speech recognition model can be deactivated and the second speech recognition model associated with the second language can be activated. This can be, in part, because the fourth score is higher than the first score.

Figure 2:
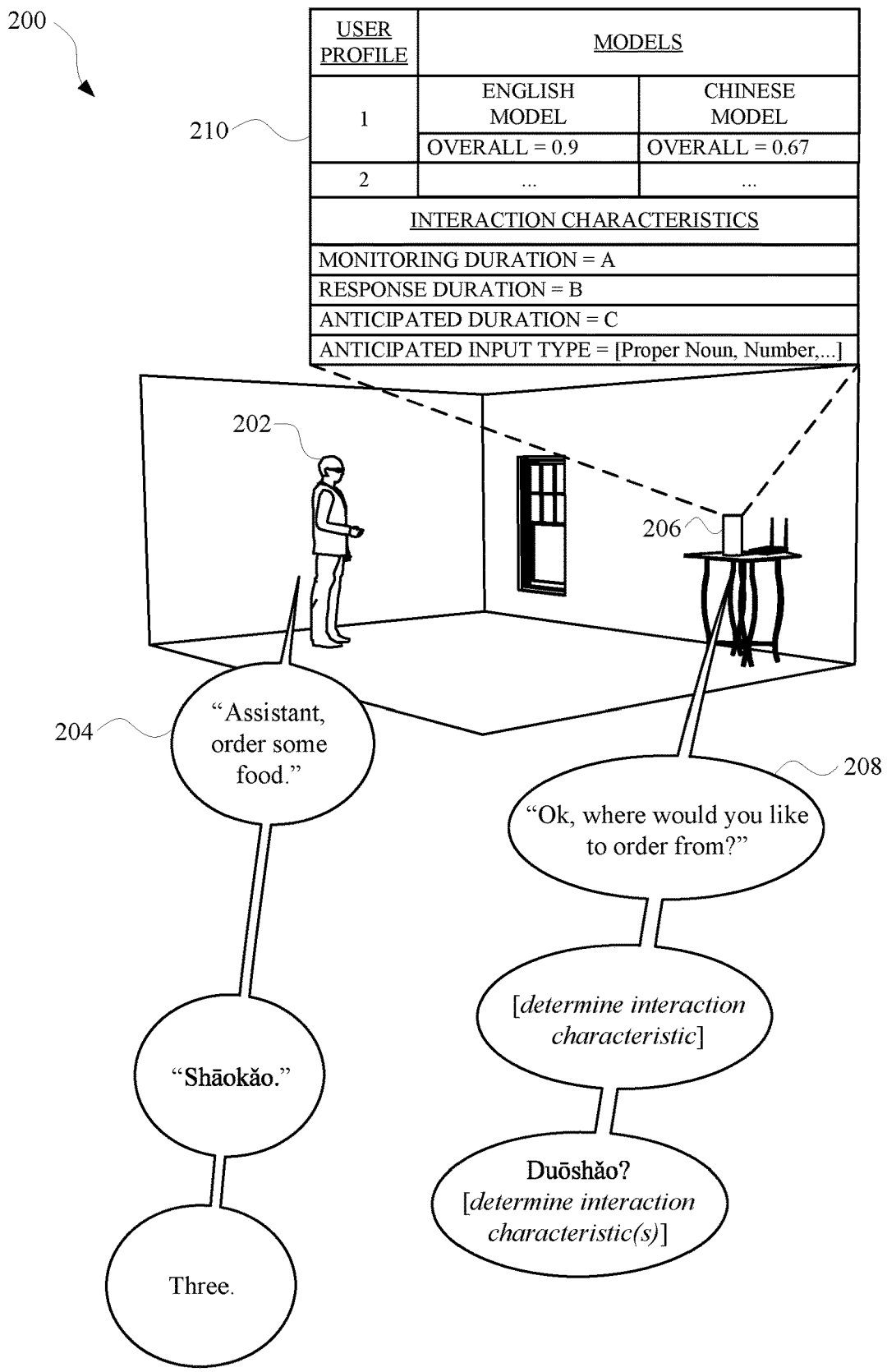
FIG. 2 illustrates a diagram that provides an example of an interaction between a user and an automated assistant, in which speech recognition models are interchanged during the interaction.

FIG. 2 illustrates a diagram 200 that provides an example of an interaction or dialog session between a user 202 and an automated assistant, in which speech recognition models are interchanged during the interaction. The interaction can be initialized when the user 202 provides an invocation phrase to an assistant device 206. The invocation phrase can be, "Assistant," and the assistant device 206 can process audio data generated in response to receiving the invocation phrase using an acoustic model to identify features of the audio data. Further, the assistant device 206 can determine a user profile that corresponds to the user 202, based on the user profile including feature that sufficiently match the features of the audio data. For instance, the assistant device 206 can store or access a table 210, which can provide one or more user profiles (e.g., "1," "2," etc.) for selecting a speech recognition model to employ for processing spoken utterances from the user 202.

User dialog 204 can be further processed to determine responsive content 208 to provide to the user 202. For instance, the automated assistant can cause the spoken utterance, "Assistant, order some food," to be processed in order to generate a suitable response, such as, "Ok, where would you like to order food from?" During the period during and/or after the time the automated assistant provides the response, the automated assistant or other module of the assistant device 206 can monitor a duration of time it takes for the user 202 to respond to the automated assistant. Additionally, or alternatively, the automated assistant can anticipate one or more interaction characteristics of the following interaction between the user 202 and the automated assistant. For example, based on the query from the user 202 regarding ordering food, the automated assistant can determine that the user 202 may provide a proper noun as a response to certain responsive content 208 from the automated assistant. Additionally, or alternatively, the automated assistant can anticipate one or more input types and/or response durations of any of the responses provided by the user 202.

As an example, based on a delay in the user 202 responding to the prompt, " . . . where would you like to order from?" the automated assistant can determine that a threshold "monitoring duration" of "A" seconds (e.g., 3 seconds) has been satisfied. In response, the automated assistant can cause multiple models (e.g., an "English" speech recognition model and a "Chinese" speech recognition model) associated with the user profile to process any subsequent spoken utterance from the user, in order to determine whether the user 202 has switched a language that are speaking in. For instance, the subsequent user dialog 204 of "Shāokǎo" can be converted to audio data and processed through an "English" speech recognition model and a "Chinese" speech recognition model. The output from each model can include text and/or phonemes, which can be processed to determine a likelihood that the user is speaking English or Chinese. Because the user dialog 204 of "Sh āokǎo" corresponds to a Chinese word, the Chinese speech recognition model output can provide an indication that the user 202 is more likely speaking Chinese over English. Therefore, the Chinese speech recognition model can remain active for the remainder of the interaction, at least until another interaction characteristic is detected. Alternatively, an "overall" score for each model can be temporarily adjusted based on the outputs of the Chinese speech recognition model and the English speech recognition model in order that that the Chinese model has a higher overall score. As a result, the Chinese model will be considered active, at least until the score is decreased upon detection or anticipation that the user will be speaking a different language, or another user is detected.

Alternatively, or additionally, based on an anticipated input type corresponding to the prompt, as indicated by the table 210 (e.g., a name of a restaurant can be a "Proper Noun"), the automated assistant can cause the "Chinese model" to be activated. Thereafter, the user 202 can provide a Chinese name for a restaurant, "Shāokǎo" (meaning Barbeque), and the audio data corresponding to the Chinese name can be processed using the Chinese language speech recognition model. In this way, by pre-emptively selecting a speech recognition model during a dialog session between a user and an automated assistant, computational resources can be preserved by filtering out speech recognition models that would otherwise be unnecessary to employ. For instance, by selecting the Chinese language speech recognition model, the Chinese name for the restaurant would not need to be processed using both an English language speech recognition model and a Chinese language speech recognition model to determine the best model to use thereafter. Rather, such duplicative processing can be eliminating by pre-emptively activating one or more speech recognition models when a language used by the user 202 is expected to change.

As further provided by the example illustrated in diagram 200, because the Chinese language speech recognition model was selected for processing the intermediate user dialog 204, the Chinese model can also be employed for generating responsive content 208 for the user 202. For instance, in response to receiving the user dialog 204, "Sh āokǎo," the automated assistant can provide responsive content 208 such as, "Duōshǎo?", which corresponds to a prompt for requesting how many orders or entrees the user 202 would like to order (i.e., "How many?"). The prompt can correspond to a particular interaction characteristic such as, for example, a numbered response, which historical interaction data can indicate the user 202 ("1") typically provides according to the English model. Therefore, in response to identifying the particular interaction characteristic (e.g., "anticipated input type"), the activate speech recognition model can be switched to the English language speech recognition model. Thereafter, when the user 202 provides the response, "Three," the automated assistant will have already activated the English model for processing audio data corresponding to the response.

Figure 3A:
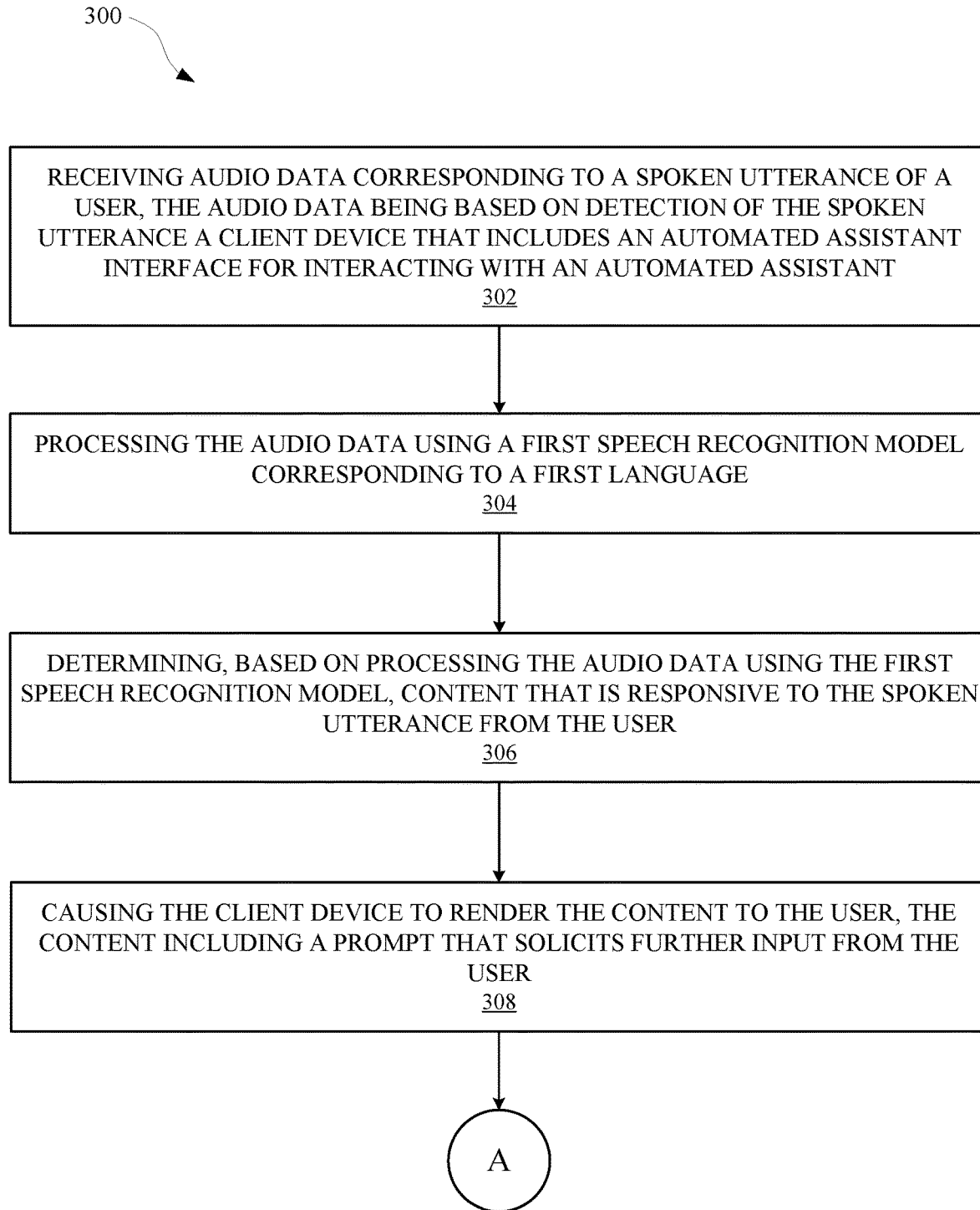
FIGS. 3A and 3B illustrate methods for selecting a speech recognition model according to circumstantial characteristics of an interaction between a user and an automated assistant.
Figure 3B:
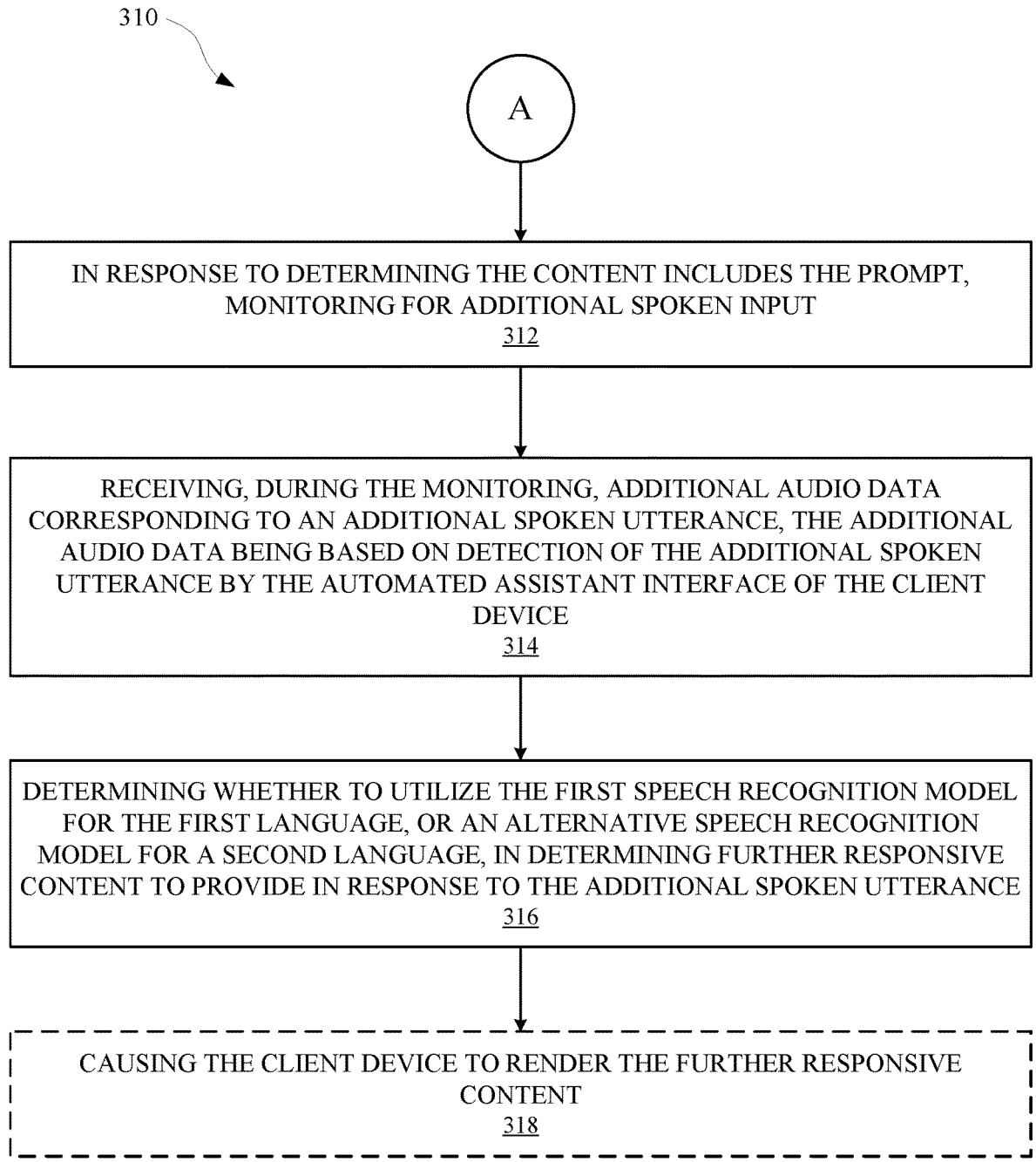

FIGS. 3A and 3B illustrate methods 300 and 310 for selecting a speech recognition model according to circumstantial characteristics of an interaction between a user and an automated assistant. The method 300 can be performed by one or more computing devices, applications, and/or any other apparatus or module capable of interacting with an automated assistant. The method 300 at FIG. 3A can continue to method 310 at FIG. 3B, according to the continuation element "A," which shows how the method 300 can proceed to method 310 at FIG. 3B. The method 300 include an operation 302 of receiving audio data corresponding to a spoken utterance of a user. The audio data can be based on the detection of the spoken utterance at a client device that includes an automated assistant interface for interacting with the automated assistant. The automated assistant interface can be one or more hardware subsystems or applications of the client device. For example, the automated assistant interface can include one or more microphones, speakers, display devices, touch interfaces, peripheral devices, and/or any other device or module capable of providing input and or output for a computing device. The spoken utterance can be a natural language input, such as an invocation phrase, for invoking or initializing the automated assistant in furtherance of an action or a task. The automated assistant can interpret natural language inputs and provide natural language outputs using one or more speech recognition models corresponding to one or more languages, respectively.

The method 300 can further include an operation 304 of processing the audio data using a first speech recognition model corresponding to a first language. A speech recognition model can correspond to a structure of data that can receive an input and provide an output, which can be further processed by an application or client device. For example, the speech recognition model can be a model that receives audio data as input and provides, as output, data that characterizes text and/or phonemes corresponding to a particular language. In some implementations, the first speech recognition model can be employed by the automated assistant in order to determine whether the user is invoking the automated assistant using one or more invocation phrases. For instance, an invocation phrase can be one or more words that can trigger the automated assistant, in order to provide the automated assistant with a discrete command regarding whether the automated assistant is being invoked or not. In some implementations, the first speech recognition model can be a default speech recognition model, and the first language can be a preferred language by the user or a first language corresponding to a highest overall score for the user. Therefore, the automated assistant or a speech recognition engine operating at the client device can employ the first speech recognition model in order to interpret the speech that the user provides in their default language.

The method 300 can also include an operation 306 of determining, based on processing the audio data using the first speech recognition model, content that is responsive to the spoken utterance from the user. The content can be, for example, audio data, textual data, phoneme data, and/or any other data that can be processed or converted into a language that can be understood by the user. The method 300 can further include an operation 308 of causing the client device to render the content to the user. In some implementations, the content can include a prompt that solicits further input from the user. For example, the spoken utterance from the user at operation 302 can be a simple invocation phrase such as, "Assistant" and the prompt can be a predetermined response issued by the automated assistant such as, "What can I help you with?" Alternatively, the spoken utterance from operation 302 can be a command corresponding to one or more actions to be performed by the automated assistant. In response to the command, the automated assistant can provide a prompt for requesting information that will assist the automated assistant in performing the one or more actions. For example, the spoken utterance from operation 302 can be, "Assistant, read my new messages," and, in response, the automated assistant can provide a prompt that solicits the user to indicate an account to read messages from (e.g., "Ok, would you like me to read your work messages or personal messages?").

The method 300 can proceed to method 310 according to the continuation element "A," illustrated at FIG. 3A and FIG. 3B. The method 310 can include an operation 312 of, in response to determining the content includes the prompt, monitoring for an additional spoken input. Monitoring for additional spoken input can include causing the client device to activate or otherwise control the automated assistant interface for receiving subsequent inputs from the user. For example, monitoring for additional spoken input can include, capturing an audio input as audio data in a buffer of the client device, in order that the audio data can be further processed by the client device or other module at the direction of an automated assistant application.

The method 310 can further include an operation 314 of receiving, during the monitoring, additional audio data corresponding to an additional spoken utterance. The additional audio data can be based on detection of the additional spoken utterance by the automated assistant interface of the client device. The additional spoken utterance can be provided by the user in order to provide one or more slot values for the automated assistant to use when performing one or more actions. For example, if the previously provided prompt from the automated assistant solicited the user to identify whether the automated assistant should read their work messages or personal messages, the additional spoken utterance can embody, in a particular language, a selection of the work messages or personal messages (e.g., "Please read my work messages.").

The method 310 can also include an operation 316 of determining whether to utilize the first speech recognition model for the first language, or an alternative speech recognition model for a second language. The automated assistant can utilize the first speech recognition model and/or the alternative speech recognition model in order to determine or generate further responsive content to provide in response to the additional spoken utterance from the user.

In some implementations, determining whether to use either speech recognition model can be based on a monitoring duration corresponding to a time period for the monitoring for the additional spoken input from the user. For example, as the monitoring duration increases, a probability of utilizing the alternative speech recognition model can increase. Alternatively, when the monitoring duration satisfies a particular threshold, the alternative speech recognition model can be selected. Alternatively, or additionally, determining whether to use either speech recognition model can be based on a response duration corresponding to a duration of the additional spoken utterance of the user. Alternatively, or additionally, determining whether to use either speech recognition model can be based on an input duration corresponding to a duration of the additional spoken utterance, at least according to a difference between un-anticipated duration for the additional spoken utterance and an actual duration of the additional spoken utterance. Therefore, for example, as a difference between the anticipated duration and actual duration increases, a probability of utilizing the alternative speech recognition model can increase. Alternatively, when the difference between the anticipated duration and the actual duration satisfies a threshold, the alternative speech recognition model can be utilized. Alternatively, or additionally, determining whether to utilize either speech recognition model can be based on an anticipated type of input for the additional spoken utterance. For example, the automated assistant can anticipate a type of input in response to the prompt such as, a number, a letter, a verb, an adjective, a noun, a pronoun, and/or any other part of speech, diction, type of speech, terminology, word or phrase that can be associated with one or more languages.

The method 310 can further include an optional operation 318 of causing the client device to render the further responsive content. The further responsive content can be rendered according to a language model that corresponds to a language of the speech recognition model selected at operation 316. In this way, the automated assistant can adapt to dynamic language preferences of a user, without the user having to explicitly request changes in language models. This can conserve computational resources, mitigate latency between responses, and conserve power, as the client device and/or automated assistant would no longer need to process spoken requests to switch language models or language preferences from the user.

Figure 4:
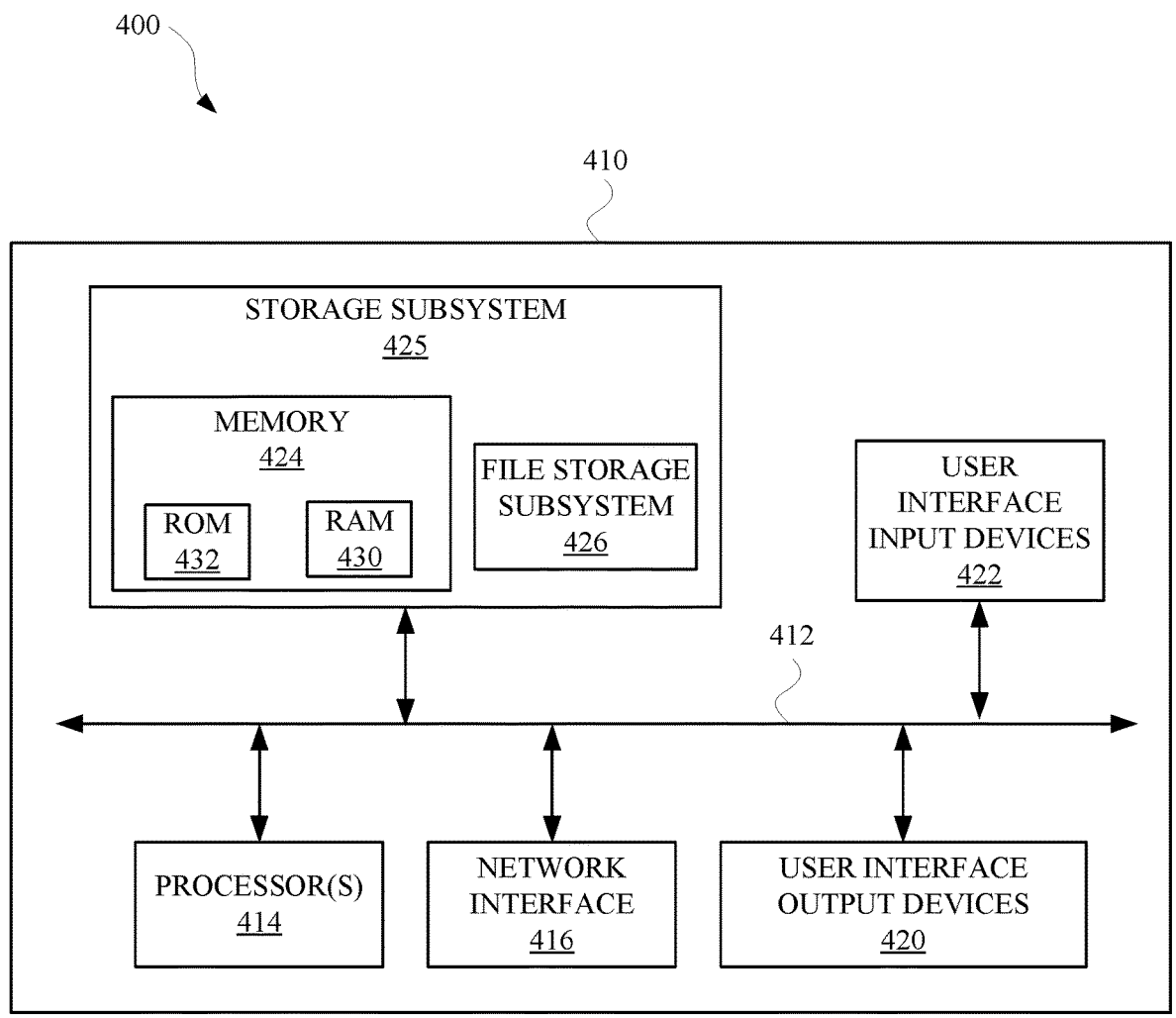
FIG. 4 is a block diagram of an example computer system.

FIG. 4 is a block diagram of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, and/or to implement one or more of server device 102, client computing device 118, portable computing device 132, assistant device 206, and/or any other device or operation discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
   receiving audio data corresponding to a spoken utterance of a user, the audio data being based on detection of the spoken utterance by a client device;
   processing the audio data, using a first speech recognition model corresponding to a first language, to generate a first text that is in the first language, wherein the first speech recognition model is a neural network model;
   determining, based on the first text generated using the first speech recognition model, content that is responsive to the spoken utterance;
   causing the content to be rendered at the client device;
   monitoring for an additional spoken input from the user;
   receiving, during the monitoring, additional audio data corresponding to an additional spoken utterance, the additional audio data being based on detection of the additional spoken utterance by the client device;
   determining, based on receiving the additional audio data, that the additional spoken utterance is provided by an additional user;
   accessing, based on the additional spoken utterance being provided by the additional user, a user profile corresponding to the additional user;
   determining, based on accessing the user profile corresponding to the additional user, that the user profile provides a correspondence between the additional user and a second language;
   based on determining that the user profile provides the correspondence between the additional user and the second language:
      using a second speech recognition model, for the second language, in processing the additional audio data to generate a second text that is in the second language, wherein the second speech recognition model is a neural network model; and causing the client device to render further responsive content that is determined based on the second text generated based on processing of the additional audio data using the second speech recognition model.

2. The method of claim 1, further comprising:

responsive to determining that the user profile provides the correspondence between the additional user and the second language, generating the responsive content in the second language.

3. The method of claim 1, wherein using the second speech recognition model in processing the additional audio data is further based on one or more interaction characteristics that occurred since receiving the audio data corresponding to the spoken utterance.

4. The method of claim 3, wherein the one more interaction characteristics comprise one or more of a monitoring duration, an input duration, and an anticipated type of input for the additional spoken utterance.

5. The method of claim 3, wherein the one more interaction characteristics comprise two or more of a monitoring duration, an input duration, and an anticipated type of input for the additional spoken utterance.

6. The method of claim 1, wherein using the speech recognition model in processing the additional audio data, based on determining that the user profile provides the correspondence between the additional user and the second language, comprises:

determining a first probability metric assigned, in the user profile to the first speech recognition model, and a second probability metric assigned, in the user profile, to the second speech recognition model; and determining that the user profile provides the correspondence between the additional user and the second language based on the second probability metric being indicative of a higher probability than the first probability metric.

7. The method of claim 6, wherein the first probability metric is based on past usage, by the additional user, of the first language and wherein the second probability metric is based on past usage, by the additional user, of the second language.

8. The method of claim 1, wherein determining, based on receiving the additional audio data, that the additional spoken utterance is provided by the additional user comprises matching voice features of the audio data to voice features associated with the user profile.

9. A system, comprising:

one or more microphones;

memory storing instructions;

one or more processors executing the instructions to:

receive audio data corresponding to a spoken utterance of a user, the audio data being based on detection of the spoken utterance by the microphones;

process the audio data, using a first speech recognition model corresponding to a first language, to generate a first text that is in the first language, wherein the first speech recognition model is a neural network model;

determine, based on the first text generated using the first speech recognition model, content that is responsive to the spoken utterance;

cause the content to be rendered at a client device;

monitor for an additional spoken input from the user;

receive, during the monitoring, additional audio data corresponding to an additional spoken utterance, the additional audio data being based on detection of the additional spoken utterance by the microphones;

determine, based on receiving the additional audio data, that the additional spoken utterance is provided by an additional user;

access, based on the additional spoken utterance being provided by the additional user, a user profile corresponding to the additional user;

determine, based on accessing the user profile corresponding to the additional user, that the user profile provides a correspondence between the additional user and a second language;

based on determining that the user profile provides the correspondence between the additional user and the second language:

use a second speech recognition model, for the second language, in processing the additional audio data to generate a second text that is in the second language, wherein the second speech recognition model is a neural network model; and render further responsive content that is determined based on the second text generated based on processing of the additional audio data using the second speech recognition model.

10. The system of claim 9, wherein one or more of the processors, in executing the instructions, are further to:

responsive to determining that the user profile provides the correspondence between the additional user and the second language, generate the responsive content in the second language.

11. The system of claim 9, wherein using the second speech recognition model in processing the additional audio data is further based on one or more interaction characteristics that occurred since receiving the audio data corresponding to the spoken utterance.

12. The system of claim 11, wherein the one more interaction characteristics comprise one or more of a monitoring duration, an input duration, and an anticipated type of input for the additional spoken utterance.

13. The system of claim 11, wherein the one more interaction characteristics comprise two or more of a monitoring duration, an input duration, and an anticipated type of input for the additional spoken utterance.

14. The system of claim 9, wherein in using the speech recognition model in processing the additional audio data, based on determining that the user profile provides the correspondence between the additional user and the second language, one or more of the processors are to:

determine a first probability metric assigned, in the user profile to the first speech recognition model, and a second probability metric assigned, in the user profile, to the second speech recognition model; and determine that the user profile provides the correspondence between the additional user and the second language based on the second probability metric being indicative of a higher probability than the first probability metric.

15. The system of claim 14, wherein the first probability metric is based on past usage, by the additional user, of the first language and wherein the second probability metric is based on past usage, by the additional user, of the second language.

16. The system of claim 9, wherein in determining, based on receiving the additional audio data, that the additional spoken utterance is provided by the additional user, one or more of the processors are to match voice features of the audio data to voice features associated with the user profile.

* * * * *